US005831808A

United States Patent [19]

Girard

[11] Patent Number: 5,831,808

[45] Date of Patent: Nov. 3, 1998

[54] LIGHTNING ARRESTER DEVICE

[76] Inventor: Francois Girard, 29, rue Eugéne Bussiére, 21000 Dijon, France

[21] Appl. No.: 817,777

[22] PCT Filed: Oct. 19, 1995

[86] PCT No.: PCT/FR95/01384

§ 371 Date: Apr. 21, 1997

§ 102(e) Date: Apr. 21, 1997

[87] PCT Pub. No.: WO96/13043

PCT Pub. Date: May 2, 1996

[30] Foreign Application Priority Data

Oct. 19, 1994 [FR] France .................................. 94/12478

[51] Int. Cl.[6] ........................................ H02H 1/00

[52] U.S. Cl. .......................... 361/118; 361/127; 361/131

[58] Field of Search .................. 361/117–119, 126–127, 361/131, 56, 91

[56] References Cited

U.S. PATENT DOCUMENTS

| | | | |
|---|---|---|---|
| 4,228,478 | 10/1980 | Jakszt et al. | 361/128 |
| 4,656,555 | 4/1987 | Raudabaugh | 361/117 |
| 4,910,632 | 3/1990 | Shiga et al. | 361/127 |
| 4,940,961 | 7/1990 | Thuries et al. | 338/21 |
| 5,043,838 | 8/1991 | Sakich | 361/117 |
| 5,218,508 | 6/1993 | Doone | 361/127 |
| 5,291,366 | 3/1994 | Giese et al. | 361/127 |
| 5,402,100 | 3/1995 | Urbanek et al. | 338/21 |
| 5,517,382 | 5/1996 | Leupp et Al. | 361/118 |
| 5,559,663 | 9/1996 | Tanaka et al. | 361/127 |
| 5,602,710 | 2/1997 | Schmidt et al. | 361/127 |
| 5,652,690 | 7/1997 | Mansfield et al. | 361/127 |

FOREIGN PATENT DOCUMENTS

| | | |
|---|---|---|
| 0 304 690 | 3/1989 | European Pat. Off. . |
| 2 678 765 | 1/1993 | France . |
| 34 26 054 | 12/1985 | Germany . |
| 60 218732 | 11/1985 | Japan . |
| 04 192502 | 7/1992 | Japan . |

*Primary Examiner*—Jeffrey A. Gaffin
*Assistant Examiner*—Michael J. Sherry
*Attorney, Agent, or Firm*—Young & Thompson

[57] ABSTRACT

A lightning arrester device with a housing (7) having two electrical contact terminals and consisting of at least one housing element (7*a,* 7*b*) containing at least one protective element (13) with terminals electrically connected to the contact terminals, the protective element being embedded in an insulating material (17) contained in the housing element (7). At least one sturdy sleeve (19) is inserted between the housing element (7) and the protective element (13) in the insulating material (17). The housing element (7*a,* 7*b*) constitutes one of the contact terminals.

8 Claims, 2 Drawing Sheets

LIGHTNING ARRESTER DEVICE

FIELD OF THE INVENTION

The present invention relates to a low voltage lightning arrester device of the type used particularly to ensure the protection of electronic materials.

BACKGROUND OF THE INVENTION

It is known that the phenomenon of lightning gives rise to instantaneous currents which can be extremely great and can reach in certain cases 10,000 to 100,000 amperes with voltages which can reach 10 to 20 millions of volts for extremely short times. So as to ensure the protection of electronic apparatus against lightning, there is interposed in the supply circuit of the apparatus lightning arrester devices constituted by components which, in normal circumstances, behave as neutral elements, but which, in the case of abrupt overvoltage due to lightning, become conductors and thus ensure the insulation of the apparatus by deflecting to the ground the current generated by the lightning.

A good lightning arrester adapted to protect electronic apparatus must have three essential qualities. On the one hand, it must have high speed of increase of current so as to deflect rapidly to the ground the energy of the lightning which, otherwise, would destroy the electronic material. The speed of increase of the current will be all the higher as the inductance of the lightning arrester is low. It must therefore be able to preserve for a sufficiently long time its effectiveness so that the deflection to the ground of the energy will last for a sufficiently long time so as to permit operation of the conventional disconnection means. This time of effectiveness is all the greater as the mechanical resistance, in all directions, of the lightning arrester is high. It must finally be adapted to be emplaced and removed repeatedly on and from its support.

There is conventionally used, to ensure such functions, gas dischargers. These gas dischargers have substantial drawbacks, and particularly they have a substantial delay, so that in certain cases and particularly in the case of particularly violent and rapid lightning, the deterioration of the electronic apparatus takes place before the grounding of the lightning current by the discharger.

There are also known lightning arrester devices constituted by cylindrical tubular elements enclosing varistors and/or zener diodes, embedded in an insulating resin. Such devices must, in a particularly reduced volume, be able to direct to the ground very high impulsional currents whilst maintaining acceptable voltages at their terminals. It will thus be seen that the power developed in such lightning arrester systems can reach excessively high values. Thus, a resistance has the possibility of transmitting currents of the order of 5,000 amperes for a time of the order of 10 microseconds, whilst maintaining the voltage at its terminals at a value of about 1,500 volts. The power thus developed in such a resistance is of the order of 7.5 megawatts. Such powers developed during extremely short times, in volumes that are also reduced, are extremely difficult to channel, such that lightning arrester devices sometimes behave as veritable miniature "bombs", with the result, in addition to the destruction of the lightning arrester device itself, the destruction of the electronic elements they are supposed to protect.

Lightning arresters are also known which are employed in high voltage energy lines used for the distribution of electric current. In these energy lines, according to the impedance of the electric current supply transformer arranged upstream of the lightning arrester, the currents developed can reach peak values of 6 to 25 kiloamperes for periods of the order of 100 microseconds. To ensure the protection of the installations, it is essential that the lightning arresters that are used maintain the ground, as cutoff devices, such as disconnectors, do not themselves ensure opening the line. It is therefore particularly important at least to retard the destruction of such lightning arresters, until the actuation of the disconnect devices. However, the components used in the construction of lightning arrester devices are conventionally clad in housings constituted of resins which are essentially selected for their insulating qualities. It is known that unfortunately the best insulating materials have particularly mediocre mechanical qualities.

Manufacturers of this type of device have therefore been confronted with the requirement to reinforce the mechanical strength of the housings enclosing the components by rigidifying them and by embedding the assembly in insulating thermosetting resins.

These solutions are not satisfactory because on the one hand, they are dangerous, and on the other hand, they are not very effective, both from a standpoint of mechanical resistance and from a standpoint of the electrical characteristics of the apparatus.

These solutions are dangerous because the resin which surrounds the region in which is generated the high instantaneous power fragments, which promotes the appearance of an electric arc leading to carbonization of this resin. The charcoal thus produced ensures the conductivity of electricity, and the current from the overvoltage, or from an energy network, passes through this latter, rapidly heating the region in question, which increases the charring of this latter and, by cumulative effect, leads to a rapid destruction of the lightning arrester, which destruction can even ignite the environment.

These solutions are also of little effectiveness, because the mass of resin, between the place where the instantaneous power is generated and the region in which is located the rigid enclosure, constitutes a malleable and/or elastic pad favoring the appearance of cracks thereby creating rupture sites decreasing the mechanical characteristics of the lightning arrester.

There has also been proposed, in French patent FR-A-2 678 765, a lightning arrester adapted for the protection of aerial electrical lines which is constituted of an envelope containing a tube provided with longitudinal slots within which are disposed varistors. A silicone elastomer fills the empty portions of the envelope, between the periphery of the varistors and the internal surface of the tube. The electrical contact takes place at each of the ends of the tube.

Such a device, if it is satisfactory in the field of protection of aerial electrical lines, is not suitable for ensuring the protection of electronic apparatus. Thus, on the one hand, the time of reaction is too high by a virtue of the length of the connection and the too-high inductances which result from it and, on the other hand, the physical protection against explosion is not ensured in a suitably effective manner, and in certain cases it is even sought to effect indications of the end of the life of the lightning arrester.

The solutions proposed by the prior art in this field are also little effective as to the speed of current increase of the lightning arrester. Thus, it is known that, to keep its effectiveness, a lightning arrester must have the property of becoming rapidly conductive, so that its inductance will be particularly low, such as not to retard excessively its becoming conductive. In devices of the prior art in this field, the presence of a rigid body requires manufacturers to provide a complex connection increasing by the same step the length of the connections and hence the inductance of the lightning arrester, which leads the latter to lose its characteristics of becoming rapidly conductive.

OBJECTS OF THE INVENTION

The present invention has for its object to provide a lightning arrester device having a high speed of increase of current, and which has a sufficient mechanical resistance to permit it to slow its destruction until means for cutting off the current such as disconnectors, etc. . . . have the time to become active, this device being easier and more rapid to connect and to disconnect.

SUMMARY OF THE INVENTION

The present invention thus comprises lightning arrester device constituted of a housing, containing two electrical contact terminals, formed by at least one housing element, enclosing at least one protective element whose terminals are connected electrically to the contact terminals, this element being embedded in a solid insulating material contained in said housing element, characterized in that at least one mechanically resistant sleeve is interposed within the insulating material, between the housing element and the protective element and in that said housing element constitutes one of said contact terminals.

In one embodiment of the invention, the housing is constituted of two housing elements and at least one of these comprises a bottom or transverse wall, made of one piece with it, the electrical contact between the protective element and the housing element taking place along said bottom. In a modification of this embodiment of the invention, the other housing element comprises also a bottom or transverse wall, which is mechanically and electrically secured to the latter, the second terminal of the protective element being in electrical contact with said bottom. Such an embodiment permits providing a particularly easy and rapid connection of the lightning arrester to its support.

In another embodiment of the invention, the sleeve is constituted by woven glass fibers or woven carbon fibers.

It should be noted that the body of the lightning arrester which constitutes one of the electrical connection terminals cannot have a homogeneous mechanical resistance over all its periphery, because the body being conductive of the electric current it must necessarily comprise an insulating region leaving the passage at the second connection terminal. This discontinuity has for its effect to make fragile the body and thereby to decrease its resistance to explosion.

The present invention permits compensating the zone of weakness of the lightning arrester body, thereby rendering possible the provision of lightning arresters having at the same time the three qualities mentioned above.

BRIEF DESCRIPTION OF THE DRAWINGS

There will be described hereafter, by way of non-limiting example, one embodiment of the present invention, with reference to the accompanying drawing, in which.

DETAILED DESCRIPTION OF THE INVENTION

Figure 1:
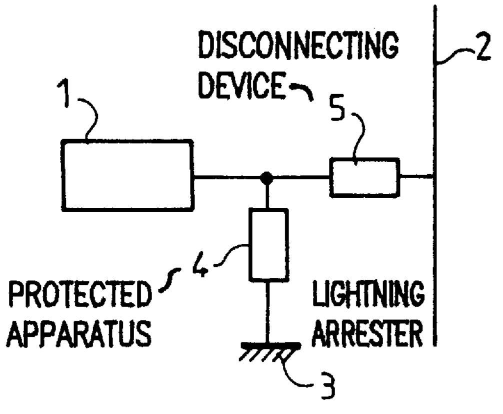
FIGS. 1 and 1*a* are schematic views showing two embodiments of a lightning arrester device according to the invention in electrical circuits which they are adapted to protect.

As shown in FIG. 1, when it is desired to ensure protection against lightning of an electronic apparatus 1 supplied with current by an electrical line 2, there is disposed, on the one hand, between the ground 3 and the electrical line 2, a lightning arrester device 4 and, on the other hand, between the line 2 and the lightning arrester device 4, a disconnecting device 5.

In the course of normal operation, the lightning arrester device 4 has a sufficient impedance to behave as a neutral element, so that it does not interfere with the operation of the apparatus 1. On the other hand, under the effect of an abrupt overvoltage due to lightning or to a "mean voltage" defect (10 to 30 KV) in the circuit, the lightning arrester then behaves as a conductive element, so that it conducts to the ground 3 the current arriving from the electrical line 2, thus short-circuiting the apparatus 1, which ensures its protection.

Figure 1A:
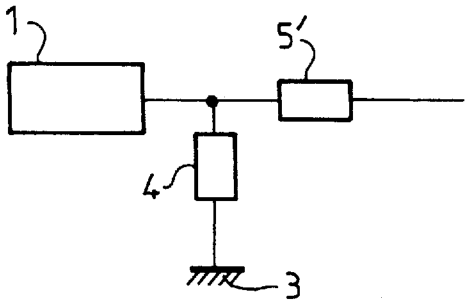

There is shown in FIG. 1*a* a lightning arrester device used to ensure the safety of a telephone line against overvoltage. In this type of use, the disconnector device 5 is replaced by a current limiting device 5', such as for example a PTC element (with positive temperature coefficient), which is to say a component whose impedance increases with heating to which it is subjected by virtue of the current which passes through it and which flows through the lightning arrester 4. The action of such a limiter is slow (of the order of several milliseconds, even several seconds).

The lightning arrester device 4 is constituted of electronic elements, such as for example zener diodes or varistors which have high speeds of current increase, which render them adapted to react in a semi-instantaneous fashion to overvoltages, and in any case well before the activation of the disconnector devices or limiters 5'.

As mentioned above, the lightning arrester device being traversed, during the appearance of lightning, by currents developing extremely high powers, it is important that its mechanical strength be sufficient so as to permit it to resist these high powers, at least during a sufficiently long time to permit the disconnector devices 5 or limiters 5' to act.

Figure 2:
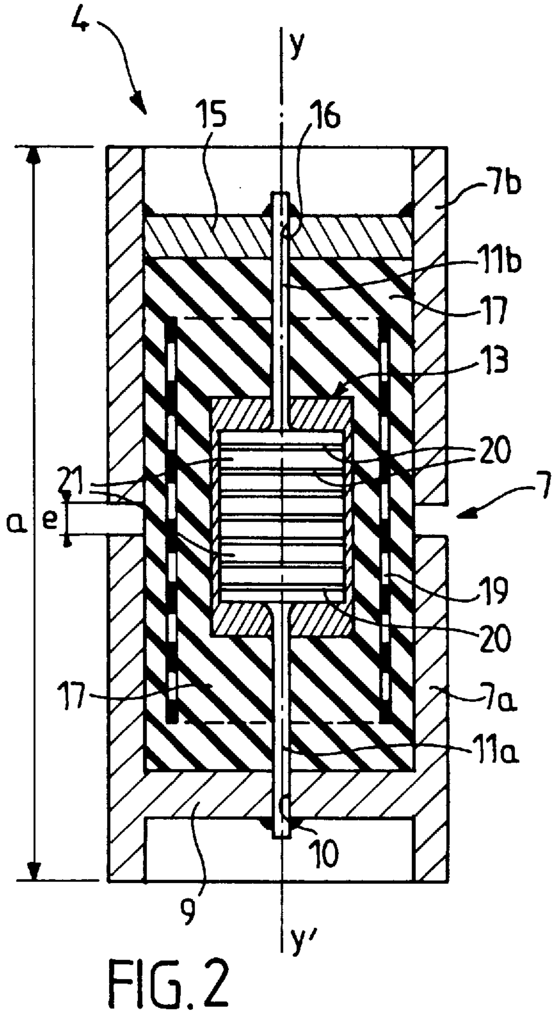
FIG. 2 is an axial and longitudinal cross-sectional view of a first embodiment of a lightning arrester device according to the invention.
Figures 3A, 3B, 3C, 3D:
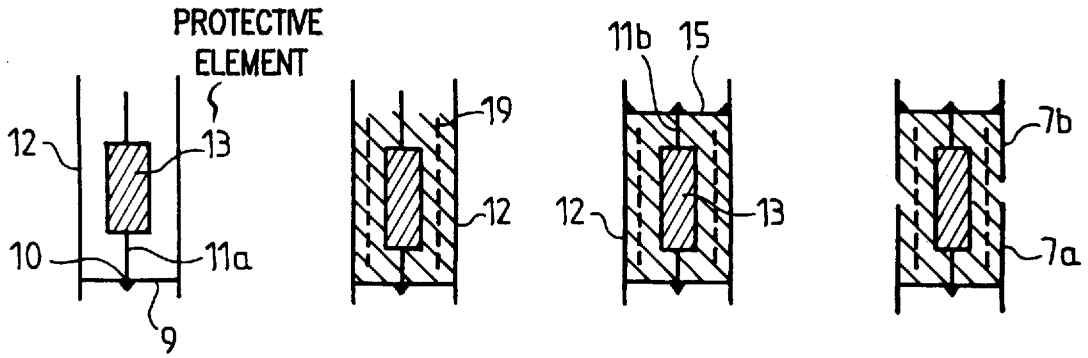
FIGS. 3*a* to 3*d* are views showing schematically the different steps of a process for production of a lightning arrester device of the type of that shown in FIG. 2.

In an embodiment of the invention shown in FIG. 2, the lightning arrester device 4 is constituted by a housing 7 formed of two cylindrical housing elements, namely a first lower housing element 7*a* and a second upper housing element 7*b*. These two housing elements are separated by a distance e. the lower housing element 7*a* comprises, in a region adjacent one of its ends, a bottom 9 which is formed during manufacture. The bottom 9 is pierced at its center with an opening 10 into engagement with which comes one of the two connection tongues 11*a* of a protective element 13, constituted essentially by a zener diode. This zener diode will be most often constituted of several silica wafers 20, of dissipators 21 which are interleaved between the silica elements and by an insulation of very high dielectric resistivity. The upper housing element 7*b* comprises a wafer 15, forming the bottom, which is secured, for example by welding, on its outer wall at a distance near one of its ends, so that it is rigidly maintained on the housing element 7*b* and in excellent electrical contact with it. The wafer 15 is pierced at its center with an opening 16 which receives the second connection tongue 11*b* of the protective element 13. The connection tongues 11*a* and 11*b* are respectively secured by soldering, or by any other process permitting ensuring both their mechanical holding and a good electrical contact with the bottom 9 and the wafer 15. The internal volume delimited by the internal walls of the housing elements 7*a,* 7*b,* the bottom 9, the wafer 15, and the external surface of the protective element 13, is filled with a solid resin 17, for example a thermosetting or epoxy resin.

The protective element 13 can of course be constituted by a component other than a zener diode, and one could also have recourse particularly to a varistor. One could in a general manner use so-called non-linear components, which is to say elements whose voltage/current characteristic has a flat terminus.

The resin 17 is selected on the one hand for its insulating qualities but also on the other hand for its qualities for adherence to the housing elements 7*a,* 7*b* as well as for its own mechanical resistance properties.

A tubular sleeve 19 is disposed in this volume, between the internal walls of the housing elements 7*a,* 7*b* and the external wall of the protective element 13.

This sleeve 19 is constituted for example of glass fibers or carbon fibers which are preferably woven.

The lightning arrester device described above has a certain number of advantages relative to corresponding devices of the prior art in this field, particularly as to the mechanical resistance to explosion, as to the connection, as to the process of manufacture, and finally as to inductance.

As to the mechanical resistance, the sleeve 19 ensures, by means of the hardenable resin 17, the holding of the housing elements 7*a,* 7*b* against external forces and stresses particularly in the longitudinal direction, when the lightning arrester device is traversed by a current of lightning such that the energy released at the silica wafers 20 brings it to a state near explosion.

The sleeve 19 also exerts a resistive action against forces exerted in a transverse direction, which is to say a direction perpendicular to the longitudinal axis yy' of the lightning arrester device, particularly in its central portion in which the spacing e provided between the two housing elements 7*a* and 7*b* to insulating them electrically constitutes a region of weakness of the lightning arrester.

Moreover, it has been noted that the sleeve 19 ensures also another function, namely that of reducing (even of totally eliminating) cracks which form in the resin, with small dimensions such that the phenomena of electric arcing can no longer take place, thereby avoiding the rapid destruction of the lightning arrester.

As concerns the connection, it will be noted that the present embodiment is interesting in that it uses electrical connections of a particularly reduced length, which promotes a high speed of current increase. Moreover, because of the cylindrical shape of the housing elements 7*a* and 7*b,* the electrical connection of the lightning arrester device with the connection housing in which it is mounted, takes place in a particularly efficacious manner. Moreover, the cylindrical shape of the housing 7 permits a symmetrical arrangement of the active elements, which further contributes to reducing the inductance.

As to the process of production of the embodiment of lightning arrester described above, an example showing the four essential steps of its practice is illustrated in FIGS. 3*a* to 3*d*.

In the course of the first step (FIG. 3*a*), we begin with a tube 12, whose length a is equal to that of the lightning arrester element once ended, and which comprises a bottom 9. There is then introduced a connection tongue 11*a* of the protective element 13 within the opening 10, then there is fixed, by soldering, said tongue 11*a* on the bottom 9. In the course of the second step (FIG. 3*b*), the sleeve 19 is placed about the protective element 13, then the resin is cast within the tube 12. In the course of the third step (FIG. 3*c*), the wafer 15 is emplaced by introducing the second connection tongue 11*b* of the protective element 13 into the opening 16 of this latter. There is then secured by soldering, on the one hand the wafer 15 on the tube 12, and on the other hand the connection tongue 11*b* on the wafer 15. In the course of the fourth step (FIG. 3*d*), there is formed a circular kerf, for example by turning, at the center of the tube 12, so as to separate the latter into two housing elements 7*a,* 7*b* completely electrically insulated from each other.

Trials carried out by the applicant have established that such a lightning arrester device is able to deflect to ground, the energy from lightning on the one hand sufficiently quickly to prevent destruction of electronic apparatus, and on the other hand, for a sufficiently long time, before destruction, that the current cutoff means of the conventional type have the time to become active.

Figure 4:
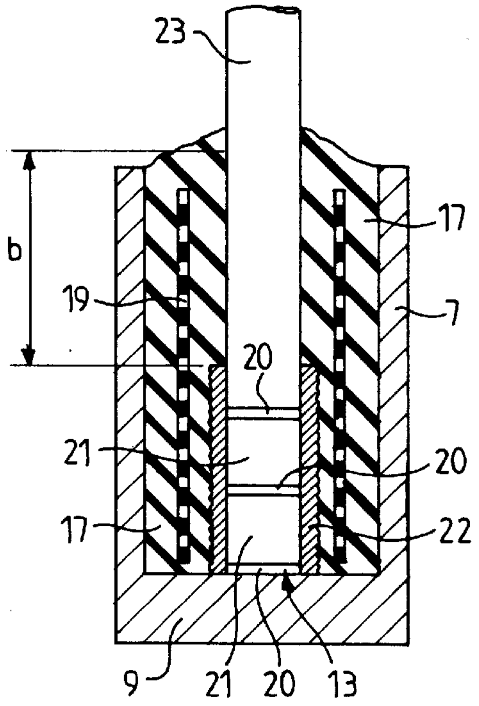
FIG. 4 is an axial and longitudinal cross-sectional view of a second embodiment of the lightning arrester device according to the invention.

Another embodiment of a lightning arrester device according to the invention is shown in FIG. 4. In the latter, the housing 7 is constituted by a cylindrical tube, closed at its lower portion by a bottom 9. In this embodiment, the protective element 13 is constituted by three silica wafers 20 disposed in series, separated by energy dissipators 21, and whose one connection face is applied against the bottom 9 and the other extends toward the upper portion, which is to say toward the outlet opening of the housing 7, by a cylindrical connection pin 23. As in the preceding embodiment, an element 22 with very high dielectric resistivity surrounds the silica wafers 20, a sleeve 19 is interposed between the protective element 13 and the internal wall of the housing 7. The sleeve 19 is prolonged upwardly, beyond the protective element 13, for a length b, substantially to the open end of the housing 7. As in the preceding embodiment, the internal volume of the cavity formed within the housing 7 is filled with an insulating resin of the hardening type. But differently from the preceding lightning arrester device, the present device comprises no closure wafer. So as to create an explosion resistance in the direction of the open portion of the housing 7, there is provided, on the side of the opening, a volume of resin, reinforced by the sleeve 19, whose mass as well as adherence to the internal wall of the housing 7 form an abutment opposing any longitudinal forces. The present embodiment can have a high explosion resistance. To do this, the length b of the volume of resin forming an abutment can be adjusted.

Figure 5:
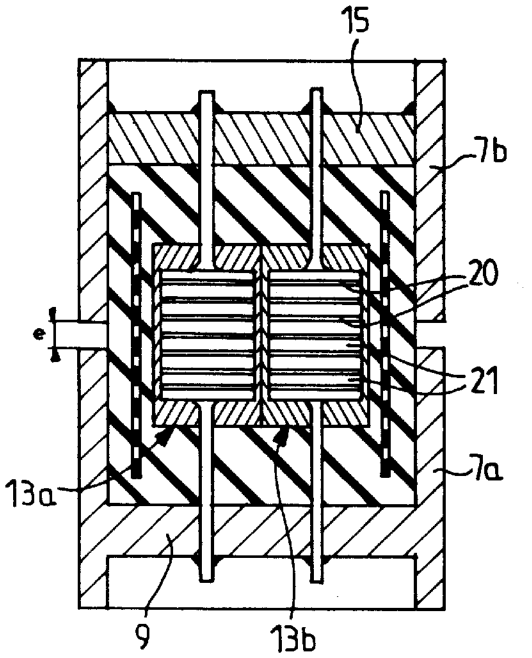
FIG. 5 is an axial and longitudinal cross-sectional view of another embodiment of the lightning arrester device according to the invention.

Of course, according to the invention, there could be associated within the housing 7 several protection elements 13*a* and 13*b* disposed either in parallel, as shown in FIG. 5, or on the contrary in series.

There could also be interposed between the housing 7 and the protection element 13 several coaxial sleeves.

I claim:

1. Lightning arrester device comprising a housing (7) constituted by two electrically conductive housing elements (7*a,* 7*b*) enclosing at least one electrical surge protection element (13) having terminals that are electrically connected to said housing elements (7*a,* 7*b*), a solid insulating material (17) disposed within said housing elements (7*a,* 7*b*) and adhering to said housing elements (7*a,* 7*b*) and insulating said housing elements (7*a,* 7*b*) from each other, said protection element (13) being embedded in said solid insulating material (17), and at least one mechanically resistant sleeve (19) interposed within the solid insulating material (17) between the housing elements (7*a,* 7*b*) and the protection element (13), the combination of the solid insulating material (17) and said at least one sleeve (19) resisting both transverse and longitudinal deformation of the device.

2. Lightning arrester device according to claim 1, wherein at least one (7*a*) of the housing elements (7*a,* 7*b*) comprises a bottom (9), or transverse wall formed of a piece with said bottom, the electrical contact between the protection element (13) and the housing element (7*a*) taking place through said bottom (9).

3. Lightning arrester device according to claim 2, wherein the other element of the housing (7*b*) also comprises a bottom (15), which is mechanically and electrically secured to said other element of the housing (7*b*), a terminal (11*b*) of the protection element (13) being in electrical contact with said bottom (15).

4. Lightning arrester device according to claim 1, characterized in that the sleeve (19) is constituted of woven glass fibers.

5. Lightning arrester device according to claim 1, characterized in that the sleeve (19) is constituted of woven carbon fibers.

6. Lightning arrester device according to claim 1, characterized in that the protection element (13) is constituted of several non-linear components disposed in series.

7. Lightning arrester device according to claim 1, characterized in that the protection element (13) is constituted of several non-linear components disposed in parallel.

8. Lightning arrester according to claim 1, which comprises several sleeves (19) coaxial to the longitudinal axis (yy') of the housing (7).

* * * * *